United States Patent [19]

Fersht et al.

[11] Patent Number: 5,056,366
[45] Date of Patent: Oct. 15, 1991

[54] PIEZOELECTRIC VIBRATORY RATE SENSOR

[75] Inventors: Samuel N. Fersht, Studio City; Stanley F. Wyse, Encino, both of Calif.

[73] Assignee: Litton Systems, Inc., Beverly Hills, Calif.

[21] Appl. No.: 456,532

[22] Filed: Dec. 26, 1989

[51] Int. Cl.⁵ ............................................. G01P 9/04
[52] U.S. Cl. .................................................... 73/505
[58] Field of Search ............... 73/505, 517 B; 310/329

[56] References Cited

U.S. PATENT DOCUMENTS

| | | | |
|---|---|---|---|
| 4,524,619 | 6/1985 | Staudte | 73/505 |
| 4,538,461 | 9/1985 | Juptner et al. | 73/505 |
| 4,654,663 | 3/1987 | Alsenz et al. | 73/505 |
| 4,655,081 | 4/1987 | Burdess | 73/505 |
| 4,898,032 | 2/1990 | Voles | 73/505 |

OTHER PUBLICATIONS

General Precision Instruments, "GPI Quartz Angular Rate Sensor" (Oct. 1985).

Primary Examiner—John E. Chapman
Attorney, Agent, or Firm—Elliott N. Kramsky

[57] ABSTRACT

A vibrating rotation rate sensor of the type that includes a generally-planar, H-shaped frame of piezoelectric material such as quartz. A first set of drive electrodes is fixed to a pair of upper tines and a second set of pickoff electrodes is fixed to a pair of lower tines. An array of control electrodes is fixed to the upper tine pair adjacent the cross-piece of the H-shaped frame. The control electrodes permit the application of control signals for nulling Coriolis-induced out-of-plane vibration of the upper tines allowing use of a resonant frame.

22 Claims, 4 Drawing Sheets

PIEZOELECTRIC VIBRATORY RATE SENSOR

BACKGROUND

1. Field of the Invention

The present invention relates to apparatus for sensing rotation rates. More particularly, this invention pertains to an improved rate sensor of the vibratory or tuning fork type.

2. Description of the Prior Art

Numerous arrangements exist for measuring rotation rate about a preselected axis in inertial space. Such apparatus, commonly designated a gyroscope, forms an essential element of any inertial navigation system. Gyroscopes include, for example, complex and difficult-to-manufacture gimballed spinning rotors, strapdown sensors such as the ring laser and the still-experimental fiber optic gyroscope. All of the above-named rate sensing devices are characterized by complexity of manufacture, expense of maintenance, or both.

Another system for measuring an input rotation rate about a preselected axis is based upon the principle of the tuning fork that was developed over one hundred (100) years ago. A rate sensor based upon that principle, marketed under the trademark "GYROTRON", was developed by the Sperry Gyroscope Corporation. That device, which, as all gyroscopes of the balanced resonant sensor or tuning fork type, provides significantly greater mechanical and operational simplicity than the above-mentioned types, operates on the principle that, when a tuning fork is rotated about its central axis, it possesses an angular momentum that is equal to the product of the rotation rate and the rotational moment of inertia. The reference motion of the tines of the tuning fork changes the moment of inertia cyclically. As a result, the rotation rate must change cyclically in a complementary fashion to conserve angular momentum. Thus, the physical operation of the tuning fork-type rate sensor is similar to that of a spinning ice skater who spins faster by pulling his arms in and slows down by extending them. Consequently, in a tuning fork sensor the outward-and-inward radial vibration of the tines is converted into a rotational vibration whose magnitude is proportional to the average input rate.

Prior art gyroscopes of the vibrating resonant type have been hampered by inadequate physical designs and material instability. Recently, attempts have been made to develop a sensor of piezoelectric crystalline material such as quartz that employs this principle. By utilizing such a material, device design can be simplified insofar as the apparatus may be vibrated and output detected as a function of inherent physical properties. An example of such a system is disclosed in U.S. patent Ser. No. 4,524,619 of Juergen H. Staudte entitled "Vibratory Angular Rate Sensor System". While representing an improvement in the art, the utility of the disclosed device is inherently limited by the fact that it is an open loop system. That is, in that device, which is comprised of two pairs of tines joined to a common stem that is fixed to a frame, the coriolis-induced strain in the output tine pair caused by reaction to the vibrating driven tine pair is taken as the system output.

Among the errors to which such a device is subject, those produced by the electronic noise associated with the preamplifier (operated in either a low-impedance current mode or a high-impedance voltage mode) are most significant and limiting. This first stage of the electronic output detection process is most critical in establishing the essential random walk characteristic of the device. In order to improve random walk, signal-to-noise ratio (S/N) can be enhanced by tuning the pickup tuning fork along its output axis to a frequency near the resonant frequency of the driven tuning fork. In this way, the output signal generated at the pickoff fork is amplified by its transmissibility at the driven fork's driving frequency. Unfortunately, the enhancement of the S/N ratio that results from tuning the pickoff tines to the driven tines is "paid for" by undesirable bandwidth attenuation. For example, if the pickoff tines are tuned to the precise frequency of the driven fork, the resultant envelope of the output signal will build up linearly with time for a steady input rate. Thus, such a device will act as a rate-integrating (or displacement) gyroscope until internal damping eventually limits the signal to a steady state oscillation amplitude at the drive frequency. Since the output signal (for a given rate) varies inversely with the frequency of the input, a very poor rate sensor results. Such a hypothetical device would have negligible bandwidth but it would eventually build up a very strong signal for D.C. rate inputs.

SUMMARY OF THE INVENTION

The present invention overcomes the foregoing and additional shortcomings of the prior art by providing, in a first aspect, an improvement in a rotation rate sensor of the type that includes a generally planar and H-shaped sensor frame of piezoelectric material, such frame including an upper pair of tines and a lower pair of tines, such tines being joined to an intermediate cross-piece. Such rotation rate sensor further includes a first array of drive electrodes fixed to the upper tines for transmitting electrical signals generated in the lower tines in response to coriolis-induced out-of-plane bending thereof. The improvement that is provided by this invention in a rotation rate sensor of the above-described type includes a third array of control electrodes for transmitting electrical signals for counteracting coriolis-induced out-of-plane bending of the upper tines. Such control electrodes are fixed to the upper tines adjacent the cross-piece of the frame.

In a further aspect, the invention provides a novel sensor. Such sensor includes a body of piezoelectric material that is arranged to provide an electrical signal output in response to an inertial input of predetermined character. At least one pickoff electrode is fixed to such body. Such an electrode is arranged to transmit electrical signals to the body for counteracting the effect of the inertial input upon the body. A feedback control circuit is provided for accepting the signals from the pickoff electrodes and for generating and providing the counteracting signal to the control electrodes.

The foregoing and additional features and advantages of the present invention will become further apparent from the detailed description that follows. This description is accompanied by a set of drawing figures. Numerals of the drawing figures, corresponding to those of the written description, point to the various features of the invention. Like numerals refer to like features throughout both the written description and the drawings.

DETAILED DESCRIPTION

Figure 1:
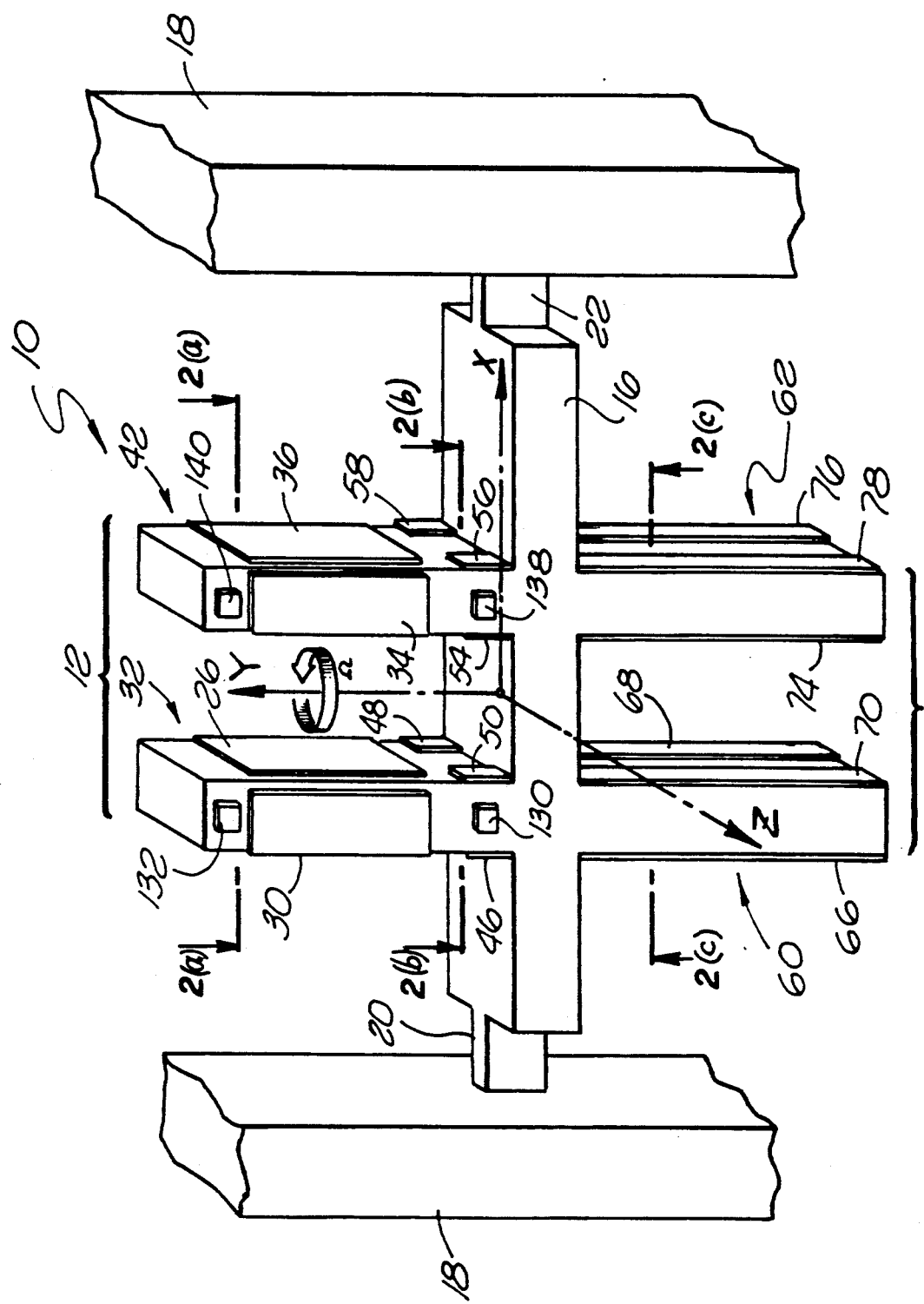
FIG. 1 is a perspective view of a piezoelectric angular rate sensor formed in accordance with the invention.

Referring now to the drawings, FIG. 1 is perspective view of a piezoelectric angular rate sensor formed in accordance with this invention. The sensor 10 comprises two pairs of tines, an upper "coriolis sensing" driven pair 12 and a lower "detecting" pair 14. The pairs of tines are supported by a cross-bridge 16 that is, in turn, fixed to a frame 18 by means of compliant flexures 20 and 22.

The sensor arrangement is formed of a single crystalline plate of piezoelectric material such as quartz. The embodiment illustrated of FIG. 1 utilizes a z-cut plate. The plate is shaped to the indicated arrangement by conventional etching techniques.

Figures 2A, 2B, 2C:
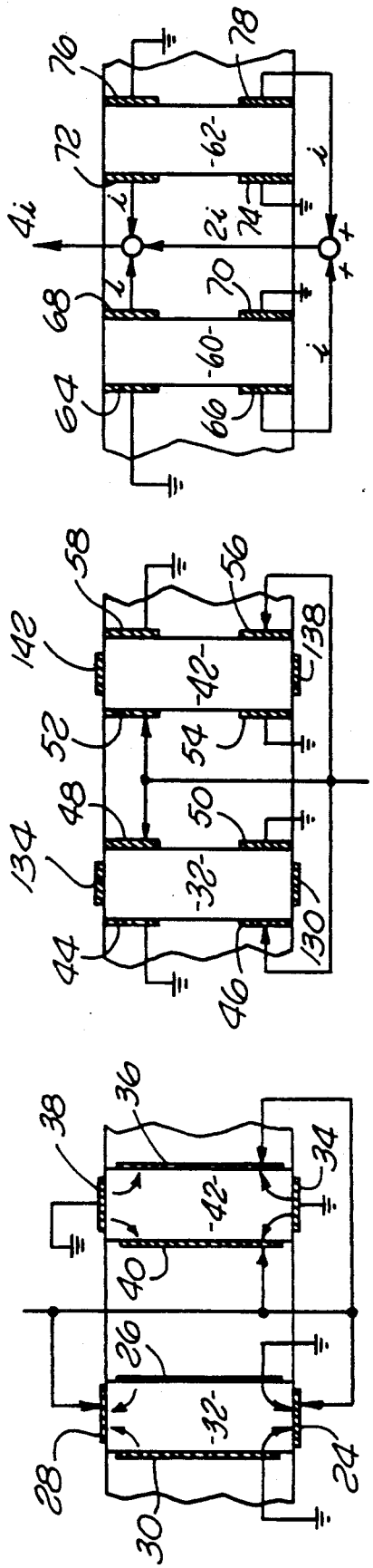
FIGS. 2(a), 2(b) and 2(c) are cross sectional views of the tines of the sensor for illustrating the arrangements of drive, control and pickoff electrodes respectively.

A plurality of electrodes, each fabricated, for example, of a titanium-gold alloy and formed by vapor deposition and pattern etching, is fixed to the sensor body. A set of drive electrodes covers the top portions of the pair of upper or driving tines 12. Thus, as shown in greater detail in FIG. 2(a), a cross sectional view of the upper tines taken at line 2(a)—2(a) of FIG. 1, drive electrodes 24, 26, 28 and 30 cover surfaces near the free end of the upper tine 32 while similar drive electrodes 34, 36, 38 and 40 cover surfaces near the free end of the tine 42. The locations of the various electrodes with respect to the quartz body of the sensor permit closed loop control of the system and realization of the attendant benefits. The electro-mechanical interactions required for such closed loop operation depend upon both the placement of the electrodes and their electrical interconnections. The wirings of the electrodes are indicated in FIGS. 2(a) through 2(c) and the effects thereof are discussed below. It should be noted that the arrangements of the electrodes and their interconnections will vary in accordance with the crystalline orientation of the quartz utilized for the sensor body. However, it will be seen that alternative embodiments possessing different electrode arrangements fall within the scope and contemplation of this invention.

A set of control electrodes, the significance of which is discussed below, is fixed to the driven tine pair 12 adjacent the cross-bridge 16. The location of the control electrodes adjacent to the cross-bridge maximizes the responsivity of the piezoelectric structure to control signals since maximum structural bending occurs in those regions. This will be seen to enhance control of the sensor body by a feedback control loop (discussed below.) FIG. 2(b), a cross-sectional view of the upper tine pair 12 taken at line 2(b)—2(b) of FIG. 1 illustrates the placement of the control electrodes for a z-cut quartz crystal oriented as shown in FIG. 1. Control electrode pairs 44, 46 and 48, 50 are oriented in the yz-plane at opposed faces of the upper tine 32 while control electrode pairs 52, 54 and 56, 58 are located in the yz-plane at opposed faces of the upper sensor tine 42. The z-cut embodiment of FIG. 1 relies upon the normal stress transconductance of quartz for operation. Such operation dictates the placement of pairs of control (and pickoff) electrodes upon predetermined tine surfaces. Otherwise, a nulling effect would result from the tensile and compression stresses that are simultaneously encountered by a single tine (at a single surface thereof). Such nulling of the piezoelectric-generated outputs and responses would render control of the device ineffective.

Pickoff electrodes are fixed to the lower tines 60 and 62 as shown in FIG. 2(c), a cross-sectional view taken along the line 2(c)—2(c) of FIG. 1. The particular arrangement shown in the embodiment of FIG. 1 is designed to detect the currents generated in the piezoelectric detector tines 60 and 62 in response to Coriolis-induced out-of-plane bending. Each of these electrodes is co-extensive in length with the detector tines. As will become apparent from the discussion to follow, the pickoff electrodes, located adjacent the cross-bridge 16, when shortened, may be utilized as voltage pickoffs for subsequent signal processing within the scope of the present invention.

As can be seen in FIG. 2(c), pickoff electrode pairs 64, 66 and 68, 70 are located in the yz plane at opposed faces of the pickoff tine 60 while electrode pairs 72, 74, and 76, 78 are located in the yz-plane at opposed faces of the pickoff tine 62. Thus, as shown in FIG. 1, a vibrating rate sensor formed of a z-cut plate of piezoelectric quartz includes an electrode arrangement in accordance with the present invention wherein pickoff electrode pairs and control electrode pairs are positioned in the yz-plane.

The arrangement of FIG. 1 is provided for measuring an input rate of rotation $\Omega$ about the y-axis. As is well-known, in a rotation sensor of the tuning-fork type, the sensing tines are vibrated in a plane that includes the input rotation vector. A drive oscillator applies a voltage to the drive electrodes 24 through 40 to effect one hundred and eighty (180) degree out-of-phase vibration of the sensor tines 32 and 42 in the xy-plane. Scale factor electrodes 130 through 144 are also shown in FIGS, 1 and 2(b). These electrodes provide feedback with respect to the amplitude of in-plane (xy plane) bending of the upper tines 32 and 42 and provide signals for regulating the drive signals provided to the electrodes 24 through 40. The details of operation of the scale factor electrodes are discussed below and in particular with reference to FIGS. 7(a) through 7(d).

It is well recognized in the art that, upon rotation of the frame 18 about the y-axis, the oscillating upper tines 32 and 42 will experience Coriolis accelerations in equal, but opposite, directions. In an open-loop vibrating rotation sensor of the type illustrated in the Staudte patent, the strains induced in the lower tine pair 14 are used as the measure of rotation rate. That is, the signals generated in the piezoelectric lower tines 60 and 62 in response to the Coriolis force exerted upon the upper tine pair 12 are "decoded" to determine rotation. As described above, such an openloop system is of limited value due to an inherent and undesirable tradeoff between bandwidth and S/N ratio.

The present invention overcomes this significant handicap of the prior art by utilizing a force-rebalanced closed loop control arrangement in conjunction with the sensor 10. By providing such a system, one may impose corrective signals, via control electrodes 44 through 58, permitting the lower tines to be closely (in fact, precisely) tuned to the upper tines to enhance S/N ratio. Bandwidth is therefore not sacrificed and the quality of the output S/N ratio is not bandwidth-dependent. Rather, as will be seen, the lower tines can be tuned to the vibration frequency of the upper tines as the control electrodes 44 through 48 are driven by a servo loop to maintain constant nulling of the stresses induced in the pickoff tines 60 and 62. Accordingly, the bandwidth of the rate measurement may be made as high as desired.

Figure 3:
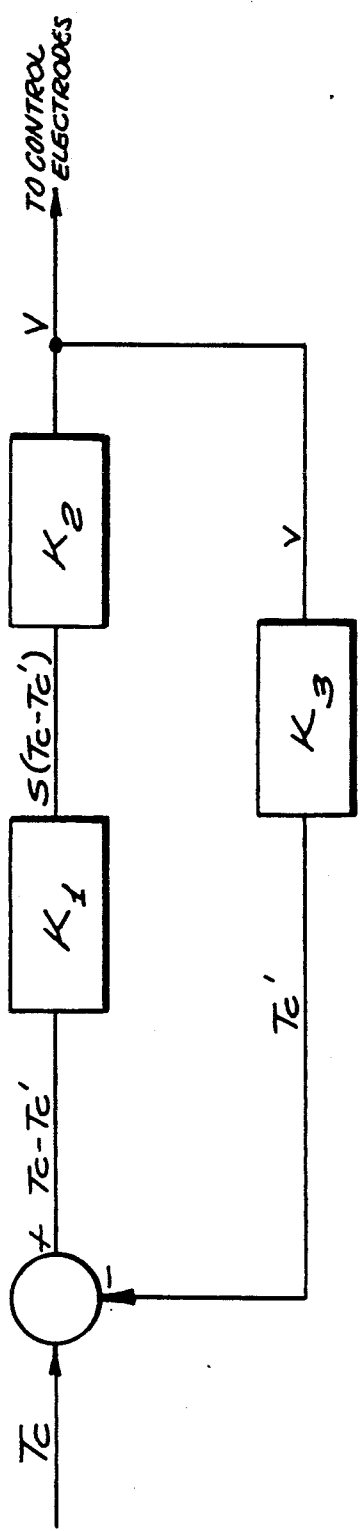
FIG. 3 is a block diagram of a feedback system for closed loop control of the sensor of the invention.
Figure 4:
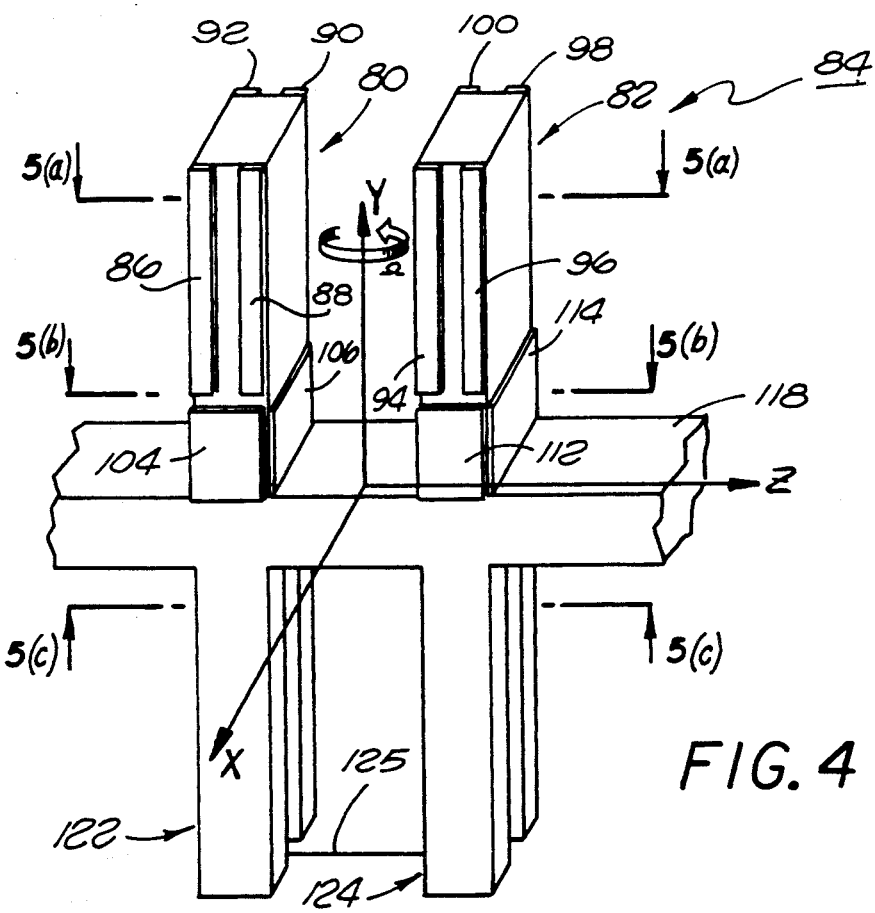
FIG. 4 is a perspective view of an alternative embodiment of the invention.

FIG. 3 is a block diagram of a feedback system for closed-loop control of the sensor 10 of the invention. As is well known, an input rate about the y-axis results in Coriolis accelerations in the z-direction (both into and out of the page, the tines 32 and 42 bending in opposite directions.) The forces acting upon the upper tine pair 12 that result from Coriolis accelerations are mechanically coupled to the lower tine pair 14 producing a measurable stress $T_c$. The piezoelectric character of the quartz, in conjunction with the arrangement and location of the pickoff electrodes 64 through 78 transforms this mechanical stress into a detectible electrical (voltage or current) signal. Referring to the closed loop control system as illustrated in FIG. 3, the stress $T_c$ experienced by the mechanical reactions of the lower tine pair 14 to the forces exerted upon the driven upper tine pair 12 are detected as measurable electrical signals $S(T_c)$, either current or voltage, such conversion being represented by a piezoelectric pickoff transformation $K_1$. The pickoff transformation model $K_1$ is determined by the location and electrical interconnections of the control electrodes in combination with the piezoelectric properties of the crystalline sensor body. As will be explained in greater detail, the pickoff electrodes at the lower tines of the z-cut plate of FIGS. 1 and 2 are arranged for detecting an electrical current indicative of the stress $T_c$ whereas the pickoff electrodes of the x-cut quartz sensor of FIGS. 4 and 5 are arranged for detecting a voltage. Thus, the piezoelectric pickoff transfer function $K_1$ yields a current for the illustrated z-cut embodiment of the invention while the same function yields a voltage in the x-cut embodiment. In either case, the principles that distinguish the present invention from the prior art remain the same.

The electrical signal $S(T_c)$ is applied to an amplifier of electrical transfer function $K_2$. The amplifier is arranged to provide a voltage output V in response to either a current (z-cut embodiment of FIGS. 1 and 2) or a voltage (x-cut embodiment of FIGS. 4 and 5) input. In either case the amplifier preferably provides very high gain. That is, its output is sensitive to the presence of very small current or voltage inputs. In terms of amplifier design, a high input impedance device is employed in the "voltage driven" embodiment whereas a low input impedance amplifier (sometimes called a "charge amplifier") is utilized in a current driven device.

The output of the amplifier is applied to the control electrodes of the sensor. As will be discussed below, the control electrodes are arranged with respect to the sensor body so that the out-of-plane bendings of the upper tines are counteracted in the manner of a force rebalanced system. That is, the voltage V is applied to the control electrodes (either embodiment) in such a way as to eliminate the net mechanical stresses exerted upon the tines. The voltage V required for nulling the mechanical stress exerted upon the lower tines by counteracting the Coriolis acceleration forces sensed by the upper tines provides the input rate of rotation after straightforward conversion.

The voltage V is fed back through a piezoelectric control transformation $K_3$ that models the effect of the voltage V, applied through the control electrode circuitry, upon the mechanical structure of the upper tines. That is, $K_3$ corresponds to the countervailing stress exerted upon the upper tines by application of the voltage V to the control electrodes. This, of course, is a function of the locations and electrical interconnections of the control electrodes with respect to the physical structure of the sensor body. As discussed above, while the values of $K_1$, $K_2$ and $K_3$ differ in the two embodiments (z-cut quartz crystal and x-cut quartz crystal), their modes of operation and the operation of the control system for effecting force rebalance are essentially identical.

The output of the transformation $K_3$, (stress exerted upon the upper tines by the control electrodes, $T_c'$), is compared to the stress exerted upon the lower tines, $T_c$, in reaction to the Coriolis acceleration force sensed by the upper tines. The very high gain of the amplifier $K_2$ provides stability to the closed-loop system. As long as $T_c$ exceeds the counter-stress generated in the upper tines by the control voltages, an error signal $S(T_c-T_c')$ will continue to drive the piezoelectric pickoff transfer function $K_1$, resulting in the continued application of a voltage signal to the control electrodes. The two quantities are equalized only when $T_c-T_c'=0$, an occurrence that one would only expect if the value of $K_1$ were to approach infinity (i.e. "integral gain"). The control voltage V is taken as a measure of the coriolis forces experienced by the upper tines and, as discussed above, as a measure of the rate of rotation about the input y-axis of the sensor.

Figure 5A:
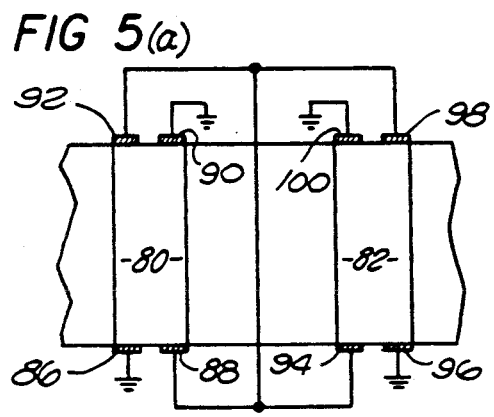
FIGS. 5(a) through 5(e) are cross-sections of the tines of the alternative embodiment taken at section lines 5(a)—5(a), 5(b)—5(b), 5(c)—5(c), 5(d)—5(d) and 5(e)—5(e) of FIG. 4.
Figure 5B:
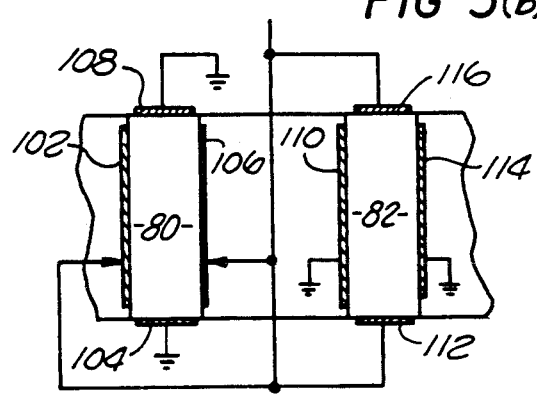
Figure 5C:
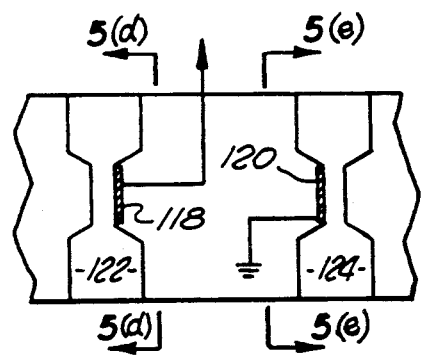

FIG. 4 is a perspective view of an alternative embodiment of the invention wherein the sensor is formed of x-cut quartz crystal and FIGS. 5(a), 5(b) and 5(c) are cross-sectional views of this alternative embodiment taken at section lines 5(a)—5(a), 5(b)—5(b), and 5(c)—5(c) respectively of FIG. 4, such views disclosing the arrangements of the drive, control and pickoff electrodes. As in the instance of the z-cut embodiment of FIGS. 1 and 2, the upper tines 80 and 82 of the x-cut sensor 84 include arrangements of drive electrodes 86 through 100 arranged adjacent the tops of the upper tines and arrangements of control electrodes 102 through 116 arranged adjacent the cross-bridge 118 of a generally "H"-shaped sensor body. As mentioned earlier, the locations of the drive and control electrodes relative to the upper tines 80 and 82 are dictated by the efficiency that is attained by locating the control electrodes adjacent the point of greatest flexion. This location is propitious insofar as the response of the piezoelectric upper tines to the control voltage signals is greatest at that point.

Figures 5D, 5E:
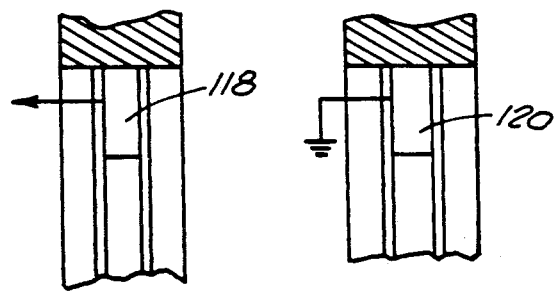

Pickoff electrodes 118 and 120 are located at opposed inner surfaces of lower tines 122 and 124 as can be seen in FIGS. 5(c) through 5(e). Each of these lower tines tapers to a narrowed mid-portion that accommodates the associated pickoff electrode. The particular shapes of the cross sections of the lower tines 122 and 124 and the locations of the pickoff electrodes upon such narrowed portions maximize the signal outputs produced by the mechanical reactions of the lower tines 122 and 124 to the stresses induced by the Coriolis accelerations of the upper tines 80 and 82.

Figure 6:
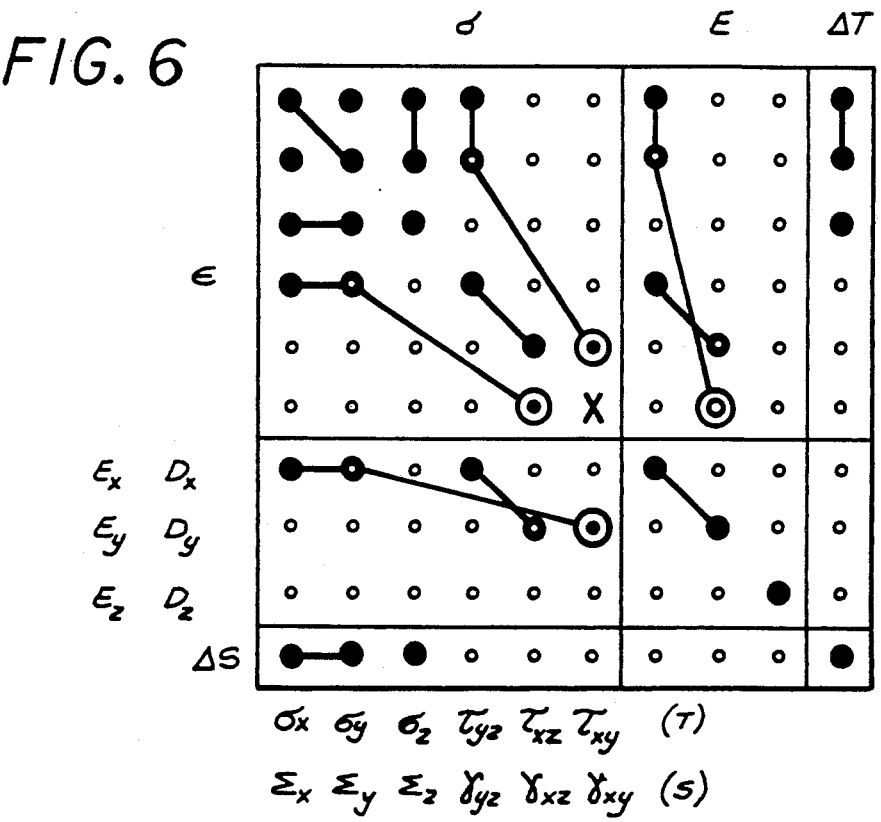
FIG. 6 is a standard crystal characteristics chart for α quartz.

As mentioned earlier, the arrangements of electrodes, the electrical interconnections therebetween for imposing stress-inducing voltages to the piezoelectric tines and for detecting stress-induced electrical signals generated therein act in combination with the crystalline structure of the sensor body to provide the requisite inputs and outputs for operation of the vibratory rate sensor in accordance with the force rebalanced closed loop control scheme illustrated in FIG. 3. FIG. 6 is a standard crystal characteristics chart of the type known as an Elasto-Piezo-Dielectric Matrix for $\alpha$ quartz. $\alpha$ quartz is preferred for fabrication of the sensor as a consequence of its piezoelectric superiority over $\beta$ material. As is well understood, such a chart employs a standard convention wherein interconnections between "dots" indicate the relative magnitudes of the effects of variables upon the crystalline structure. That is, taking a solid dot as a positive quantity, a hollow dot connected thereto and having the same size indicates an effect of equal magnitude and opposite sense while a solid dot within a larger, hollow dot indicates an effect of much greater magnitude.

Referring now to FIG. 6, the piezoelectric character of $\alpha$ quartz is indicated diagrammatically by the arrangement of dots within the block numbered 126. Electrical fields $E_i$ and displacement fields $D_i$ characterize the three rows of dots, each field being aligned along the corresponding axis indicated by the coordinate systems of FIGS. 1 and 4. The first three columns of the piezoelectric chart 126 indicate longitudinal stresses $\sigma_i$ or strains $\epsilon_i$ exerted upon the crystal in the referenced direction while the last three columns indicate transverse strains $\tau_{ij}$ and $j$ experienced by it in the indicated planes relative to the coordinate systems of FIGS. 1 and 4. Reference will be made to the piezoelectric characteristics of $\alpha$ quartz throughout the discussion of the electromechanical operations of the z-cut crystal sensor of FIGS. 1 and 2 and the x-cut crystal of FIGS. 4 and 5 in accordance with the closed loop force rebalance system of FIG. 3. It will be appreciated, of course, that, while the present invention is illustrated with respect to two embodiments fabricated of $\alpha$ quartz, it may also be fabricated of other piezoelectric materials including, but not limited to, beta quartz, that possess different piezoelectric characteristics. While such alternative fabrication may require changes in the arrangements of electrodes and the electrical interconnections therebetween, such variations are contemplated within the scope of the present invention and necessary adaptations shall become readily apparent from the discussion of the principles incorporated into the designs of the embodiments fabricated of $\alpha$ quartz.

INTERCONNECTIONS OF ELECTRODES FOR CLOSED LOOP OPERATION

Referring again to FIG. 2(a), it is seen that the drive electrodes 26 and 30 located in the yz plane at the opposed sides of the upper tine 32 and the electrodes 4 and 38 located in the xy plane at the front and rear surfaces of the upper tine 42 are grounded. The drive electrodes 24 and 28 at the front and rear surfaces of the upper tine 32 (xy plane) and the electrodes 36 and 40 (yz plane) of the upper tine 42 receive a sinusoidal driving voltage signal $V_d$. The directions of the instantaneous electrical fields are indicated within the cross sections of the upper tines 32 and 42 in FIG. 2(a). As can be seen, electrical fields $E_x$ of equal and opposite directions are created at opposed (i.e. "inner" and "outer") sides of each of the upper tines 32 and 42, the directions being reversed in the two tines. By reference to the chart of FIG. 6, this results in the creation of stresses of equal magnitudes and opposite directions at the inner and outer edges of each of the upper tines 32 and 42 producing simultaneous "pushing down" and "pulling up" of the inner and outer edges of each of those tines, the relative stresses at such edges being reversed or 180 degrees out-of-phase from tine to tine. Such stressing drives each tine to flex inwardly and outwardly (i.e. along the x-axis) producing the out-of-plane tuning fork vibrations of the upper tines for sensing Coriolis acceleration forces.

The out-of-plane Coriolis-induced stressing of the upper tines causes reactive out-of-plane bending of the lower tines 60 and 62. When the lower tines 60 and 62 flex in the yz plane, shear stresses $\tau_{yz}$ of equal and opposite sign are experienced at the front and rear of each of such tines. The opposite senses of the stresses reflect the fact that, at any given time, one edge is in compression while the other edge is in tension. By referring to the chart of FIG. 6, displacement charge fields $D_x$ of equal and opposite sign are generated at the rear and front edges of each of the lower tines during flexure. As noted earlier, the pickoff electrodes of the z-cut embodiment, lying in the yz plane extends the lengths of the lower tines 60 and 62 and, as seen in FIG. 2(c), the electrodes 64, 70, 74 and 76 are grounded while electrodes 66, 68, 72 and 78 located opposite thereto vis a vis the lower tines 60 and 62 and are in communication with a current summing node 79. Due to the grounding of electrodes at opposite sides of each of the lower tines, current flows of identical sign between the pairs of pickoff electrodes at the sides of the lower tines 60 and 62 will be induced. These flows are summed as shown in FIG. 2(c) to provide an output current signal indicative of the stress induced in the lower tines in response to the Coriolis forces detected by the upper tines. Such signal is four times the current that would be induced were one to employ a single pair of currentsensing electrodes oriented as shown. Thus, the arrangement of electrodes as shown in FIG. 2(c) effects the transfer function $K_1$ of the control system illustrated in FIG. 3.

The control electrodes are arranged as shown in FIG. 2(b). The two sets of pairs of control electrodes associated with each of the upper tines 32 and 42 are wired, insofar as the grounding of electrodes, in the same way as the pickoff electrodes shown in FIG. 2(c). The control electrodes impose voltages to cause mechanical stress that counteracts the out-of-plane stressing of the upper tines 32 and 42 which is, of course, transmitted to the pair of lower tines 60 and 62. A sinusoidal control voltage $V_c$ is simultaneously applied to the nongrounded electrodes 48 and 52 formed at the rear inside surfaces and to the electrodes 46 and 56 formed at the front outside surfaces of the upper tines. As a result, electrical fields of opposite sign are induced along the direction of the x-axis at the front and rear surfaces of each of the upper tines, the directions of the fields being reversed from tine to tine. Once again referring to FIG. 6, such a distribution of electrical fields produces stresses $\sigma_y$ of equal magnitudes and opposite directions at the front and rear edges of each of the upper tines. The simultaneous and opposed stressings of the front and rear edges counteract the out-of-plane bending of the upper tines that occurs in response to coriolis acceleration forces. Thus, referring to FIG. 3, the arrangement of control electrodes shown in FIG. 2(b) effects the transformation $K_3$ required for nulling the stress $T_c$ in the lower tines by producing a counteracting stress $T'_c$ in the upper tines. Accordingly, the arrangement of FIGS. 1 and 2 provides the requisite electrode geometry for effecting closed loop feedback control of the z-cut $\alpha$ quartz embodiment of the device.

Figures 7A, 7B:
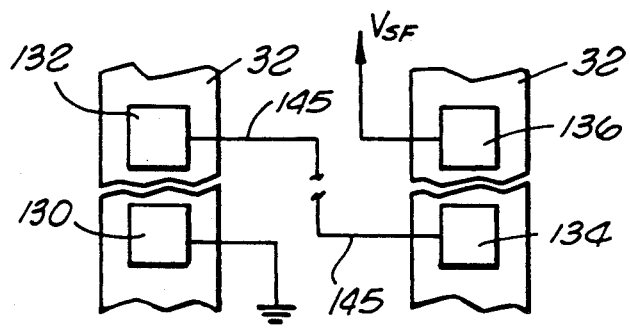
FIGS. 7(a) through 7(d) are partial front and rear elevation views of the upper tines of the z-cut embodiment that illustrate the arrangement of the scale factor electrodes.
Figures 7C, 7D:
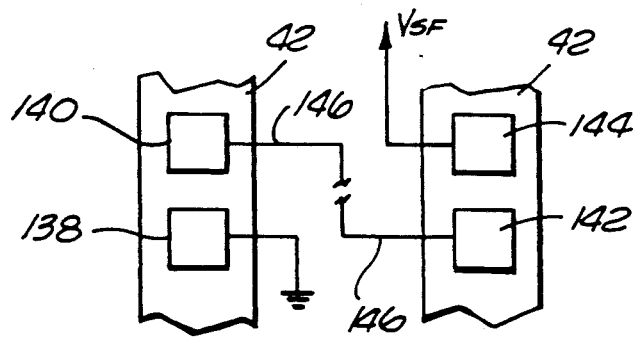

FIGS. 7(a) through 7(a) are partial front and rear elevation views of the upper tines 32 and 42 that illustrate the arrangements and electrical interconnections of the scale factor electrodes 130 through 144. The front and rear faces of the tine 32 are shown in FIGS. 7(a) and 7(b) respectively. As can be seen, the front scale factor electrode 130 is grounded, the front and rear scale factor electrodes are tied together by means of a conductor 145 and the output voltage is taken at the rear electrode 136. A similar arrangement is provided for the scale factor electrodes of the upper tine 42.

The scale factor electrodes measure the amplitude of in-plane vibration of each of the upper tines in response to the drive voltages applied to the electrodes 24 through 40. The in-plane amplitudes of vibration may vary from tine to tine as differences in the surface finishes of the two tines can result in different damping characteristics. Such a difference in the vibrations of the tines can introduce errors as common mode rejection of acceleration effects would then be imperfect. Thus, for each tine, the scale factor electrode set provides an input for regulating the signal that drives that tine.

The scale factor electrodes are arranged to measure shear stress $\tau_{xy}$ induced voltage $E_y$. The sections of the upper tines which are located closer to the free ends will experience smaller shear stresses than those closer to the cross-piece 16. As the chart of FIG. 6 indicates, such shear stress will induce electrical fields $E_y$ along the lengths of the upper tines 32 and 42. Accordingly, electrical potential differences are created in each instance between the regions of the upper tines adjacent the lower scale factor electrodes 130, 134, 138 and 142 and those adjacent the upper scale factor electrodes 132, 136, 140 and 144 respectively. Due to the locations and interconnections between the scale factor electrodes as shown in FIG. 7, the integrated potential difference due to the differential shear stresses adjacent the top and bottom of each upper tine is measured as a voltage.

The interconnections between the upper and lower scale factor electrodes of an upper tine result in additive outputs. That is, the voltages $V_{sf}$ tapped at the scale factor electrodes 136 and 144 are each twice the integrated potential difference $E_y$ induced within the upper tines 32 and 42. Thus, the sinusoidal signals from the scale factor electrode arrangements provide clear indications of the effect of the sinusoidal drive voltage $V_d$ upon each of the upper tines. Conventional control circuitry may be employed for regulating the driving signal applied to the drive electrodes of each upper tine accordingly.

Referring now to the alternative embodiment formed of x-cut $\alpha$ quartz shown in FIGS. 4 and 5(a) through 5(e), the drive electrodes 86 through 100 are seen to be arranged into pairs located at the inner and outer edges of the front and rear surfaces of the upper tines 80 and 82. One of each of such pairs is grounded. Thus, paired electrodes 86 and 92 are located adjacent the outside edge of the upper tine 80, the electrode pair 88 and 90 is located adjacent the inner edge of the upper tine 80, the pair consisting of electrodes 94 and 100 is located adjacent the inner edge of the upper tine 82 and the electrode pair 96 and 98 is located adjacent the outer edge of the upper tine 82. As can be seen, the circuit arrangements associated with the two upper tines 80 and 82 are wired as mirror images of one another.

In accordance with the arrangements of the drive electrodes for the x-cut embodiment, it can be seen that, upon the application of a sinusoidal driving signal to the upper tines, electrical fields $E_x$ of opposite sign are caused to occur along the inner and outer edges of the upper tines 80 and 82, the directions of the alternating fields being the same at the inner edges and the outer edges from tine to tine. Accordingly, referring again to the chart of FIG. 6, each of the upper tines 80 and 82 simultaneously experiences stresses of equal magnitude and opposite direction along the y axis at its inner and outer edges. Such simultaneous stressing of an upper tine at its inner and outer edges results in the alternating inward and outward vibration of the tine. That is, the tine vibrates "in-plane" (yz plane). Due to the fact that the inner and outer edges to upper tines are identically wired, inward and outward in-plane bending of both tines occurs simultaneously. As a result, the application of a sinusoidal voltage signal to the drive electrodes 86 through 100 produce the required one-hundred and eighty (180) degree out-of-phase in-plane vibration of the upper tines as required for operation of the device.

The pickoff electrodes 118 and 120 of the x-cut embodiment are shown in FIGS. 5(c) through 5(e). As can be seen, one of such electrodes, the electrode 120, is held at ground while the other, the electrode 118, may "float". When a rate of rotation is detected, the lower tines 122 and 124 are caused to bend out-of-plane. That is, the electrodes 122 and 124 flex in the xy plane. Accordingly, the two lower tines 122 and 124 simultaneously experience stresses $\tau_{xy}$ of equal magnitude and opposite sign. Referring to the chart of FIG. 6, such shear stresses produce potential differences along the y-axis of equal and opposite magnitudes in the lower tines 122 and 124. (It should be noted that the central narrowing of each of the lower tines maximizes the effect of the shear stresses exerted upon the lower tines and, consequently, increases the potential difference generated within each of the lower tines 122 and 124.)

A conductor 125 joins the lower or free ends of the lower tines 122 and 124. In operation, as a consequence of the grounding of the electrode 120 and the interconnection between the bottom edges of the lower tines 122 and 124, the voltage output of the pickoff electrodes taken at the electrode 118 is a sinusoidal signal whose magnitude is twice that indicated by the chart of FIG. 6. Thus, the arrangement of electrodes shown in FIGS. 5(c) through 5(e) provides a relatively strong signal output for application to the transform $K_1$ of the control system shown in FIG. 3.

The control electrodes of the x-cut embodiment are disclosed in FIG. 5(b). As shown, sets of four control electrodes surround each of the upper tines 80 and 82. Furthermore, two sets of control electrodes are asymmetrically wired, the front and rear electrodes 104 and 108 respectively of the upper tine 80 and the inside and outside electrodes 110 and 114 of the upper tine 82 being grounded. In operation, the control electrodes of the x-cut embodiment operate in substantially the same way as do the drive electrodes of the z-cut embodiment of FIG. 2(a). That is, upon the application of a sinusoidal voltage to the electrodes located at the inner and outer surfaces of the upper tine 80 and the front and rear surfaces of the upper tine 82, electrical fields $E_x$ of equal magnitude and opposite directions occur at the front and rear edges of the upper tines 80 and 82, the directions of the fields being reversed in the two tines. This results in the imposition of stresses $\sigma_y$ of equal magnitude and opposite directions at the front and rear edges of each of the upper tines producing out-of-plane (inward and outward) bending of each, the directions of bending being reversed from tine-to-tine. Referring again to the feedback control loop of FIG. 3, the placement and wiring of the control electrodes as shown in FIG. 5(b) effects the necessary transformation $K_3$ for achieving the desired closed loop operation in an x-cut embodiment of the invention.

Thus it is seen that the present invention provides novel arrangements for attaining the highly desirable closed loop control of a rotation rate sensor of the type that includes a generally-planar and H-shaped sensor frame of piezoelectric material. By employing the teachings of the present invention, one may fabricate such a frame in accordance with a number of crystalline orientations and, in each such orientation, attain the enhanced operating characteristics that are realized when the upper and lower tine pairs are mutually tuned at resonance.

While this invention has been described with regard to its presently preferred embodiment, it is not limited thereto. Rather, this invention is only limited insofar as defined by the following set of claims and includes all equivalents thereof.

What is claimed is:

1. In a rotation rate sensor of the type that includes a generally planar and H-shaped sensor frame of piezoelectric material, said frame including an upper pair of tines and a lower pair of tines, said tines being joined to an intermediate cross-piece and further including a first array of drive electrodes fixed to said upper tines for transmitting electrical signals for driving said upper tines in-plane and a second array of pickoff electrodes fixed to said lower tines for transmitting electrical signals generated in said lower tines in response to Coriolis-induced out-of-plane bending thereof, the improvement comprising:
 a) a third array of control electrodes for transmitting electrical signals for counteracting Coriolis-induced out-of-plane bending of said upper tines; and
 b) said control electrodes are fixed to said upper tines adjacent said cross-piece.

2. A rotation rate sensor as defined in claim 1 further including:
 a) a fourth array of scale factor electrodes, said electrodes being arranged to detect inplane bending; and
 b) said array of scale factor electrodes is fixed to said upper tines.

3. A rotation rate sensor as defined in claim 2 fabricated of a quartz.

4. A rotation rate sensor as defined in claim 3 wherein said generally planar sensor frame is a z-cut crystal.

5. A rotation rate sensor as defined in claim 4, including generally-planar pairs of pickoff electrodes located in the yz-plane and fixed to opposite sides of said lower tines.

6. A rotation rate sensor as defined in claim 5 wherein the top of each of said pickoff electrodes is adjacent said cross-piece.

7. A rotation rate sensor as defined in claim 6 wherein each of said pickoff sensors extends substantially the length of a lower tine.

8. A rotation rate sensor as defined in claim 7 further including:
 a) an electrical circuit in communication with said pickoff electrodes; and
 b) said circuit is arranged to provide an electrical current responsive to out-of-plane bending of said lower tines.

9. A rotation rate sensor as defined in claim 4 including generally-planar pairs of control electrodes located in the yz-plane and fixed to opposite sides of said upper tines.

10. A rotation rate sensor as defined in claim 9 wherein the bottom of each of said control electrodes is adjacent said cross-piece.

11. A rotation rate sensor as defined in claim 10 further including:
 a) an electrical circuit in communication with said control electrodes; and
 b) said circuit is arranged to accept a voltage signal for counteracting out-of-plane vibration of said upper tines.

12. A rotation rate sensor as defined in claim 4 including generally-planar pairs of scale factor electrodes located in the xy-plane and fixed to opposed faces of said upper tines.

13. A rotation sensor as defined in claim 12 wherein each of said pairs of scale factor electrodes includes a lower electrode and an upper electrode, each lower and upper electrode being fixed to a surface of an upper tine and separated by the drive electrode fixed to said surface of said tine.

14. A rotation sensor as defined in claim 13 wherein each lower scale factor electrode is located adjacent said cross-piece.

15. A rotation rate sensor as defined in claim 3 wherein said generally-planar sensor frame is an x-cut crystal.

16. A rotation rate sensor as defined in claim 15 including generally-planar pickoff electrodes located in the xy-plane and fixed to the inner sides of said lower tines.

17. A rotation rate sensor as defined in claim 16 wherein the top of each of said pickoff electrodes is adjacent said cross-pieces.

18. A rotation rate sensor as defined in claim 17 further characterized in that:
 a) each of said lower tines includes a narrowed central portion;
 b) said narrowed central portion is oriented in the xy-plane; and
 c) said pickoff electrodes are located within said narrowed portions of said lower tines.

19. A rotation rate sensor as defined in claim 18 further including:
 a) an electrical circuit in communication with said pickoff electrodes; and
 b) said circuit is arranged to provide a voltage signal responsive to out-of-plane vibration of said lower tines.

20. A rotation rate sensor as defined in claim 15 including generally-planar control electrodes located on all surfaces of said upper tines.

21. A rotation rate sensor as defined in claim 20 further including:
   a) an electrical circuit; and
   b) said circuit is arranged to accept a voltage signal for nulling vibration of said upper tines.

22. A sensor comprising:
   a) a generally planar and H-shaped sensor frame of piezoelectric material, said frame including an upper pair of tines and a lower pair of tines joined to an intermediate cross-piece;
   b) at least one pickoff electrode fixed to said lower tines, said at least one electrode being arranged to transmit electrical signals generated within said frame of piezoelectric material in response to an inertial input;
   c) at least one control electrode fixed to said frame, said at least one electrode being arranged to transmit electrical signals to said frame of piezoelectric material for counteracting the effect of said inertial input upon said frame; and
   d) a feedback control circuit for accepting said signal from said at least one pickoff electrode and for generating and providing said counteracting signal to said at least one control electrode.

* * * * *